June 10, 1930.   R. J. NORTON   1,763,251
BRAKE DRUM STRUCTURE
Filed Dec. 7, 1928
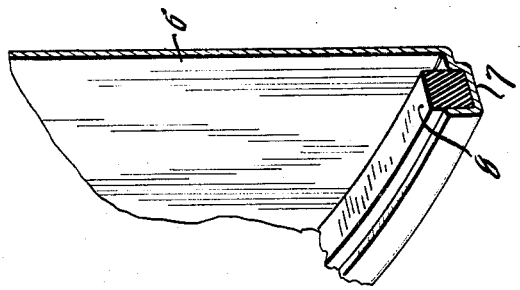
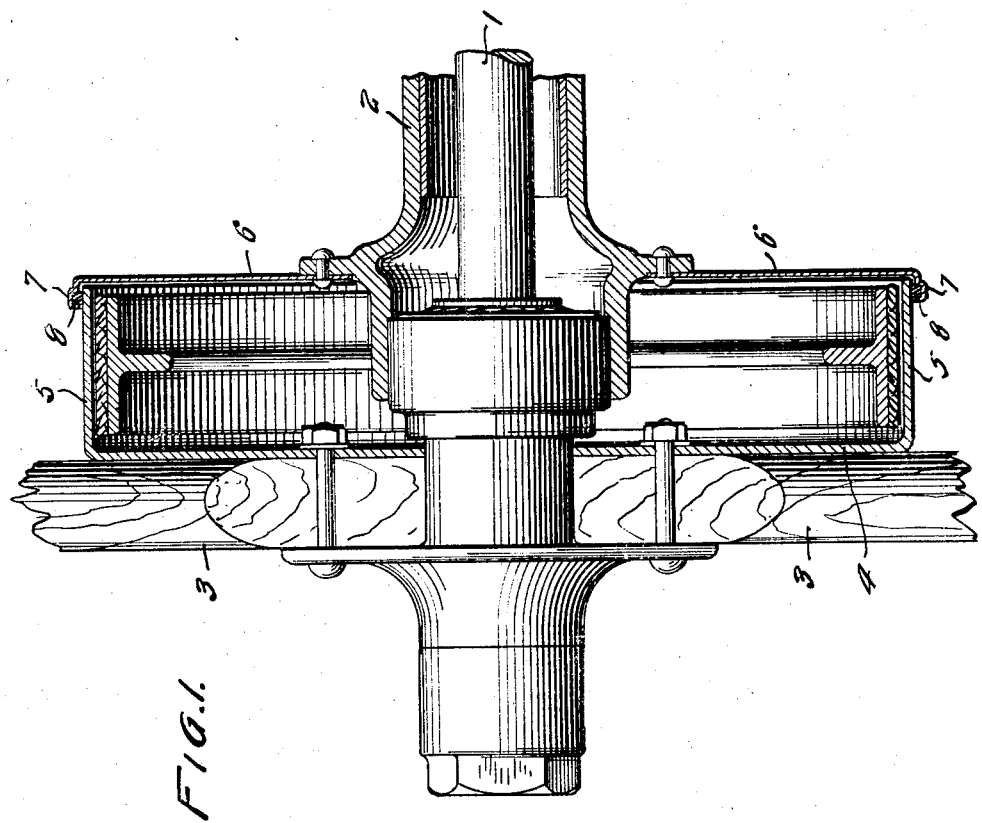
Inventor
RAYMOND J. NORTON
By M. W. McConkey
Attorney Patented June 10, 1930

1,763,251

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE-DRUM STRUCTURE

Application filed December 7, 1928. Serial No. 324,363.

This invention relates to improved brake-drum structures and more particularly to automotive brakes.

The usual form of brake structure utilized on automotive vehicles comprises a brake drum and an associated backing plate. The backing plate is fixed to the rear axle housing or front wheel spindle, and serves to mount the brake mechanism. If an internal expanding brake is associated with the brake drum, it becomes important, for obvious reasons, to provide as tight a closure between the drum and the backing plate as is practical.

This has been done heretofore by closely juxtaposing metallic portions of the drum and backing plate, as for example, by providing the drum with a radially extending marginal lip, and forming an axially extending flange on the backing plate fitting adjacent the lip. Because of the fact that the brake drum is subjected to the expansive effect of frictional heats, a substantial initial clearance between the drum and the backing plate must be allowed.

It is a major purpose of the present invention to provide a very close joint between the drum and the backing plate by utilizing a non-metallic substance secured to the backing plate, or, if desired, to the drum. For this purpose a material should be chosen which has a relatively small coefficient of expansion, impervious to water, economically provided and easily applied.

It is found that these conditions are well fulfilled by utilizing a rubber or rubberized fabric member to close off the gap or space existing between the rotatable and non-rotatable parts.

The invention in its specific application comprises adhering directly to one of these associated metallic members a ring or annulus of rubber.

The specific character of the closure member, it will be understood, may vary through a relatively wide range. For example, the closure member may consist of substantially pure rubber which, as indicated, is fixed or adhered directly either to the backing plate or drum. However, in the preferred form the rubber is somewhat stiffened or rigidified by incorporating into it a fibrous substance. It is to be understood also that the term rubber is used in the specification and claims with a broad connotation to include both natural curable rubber and synthetic rubber derivatives.

In the illustrated embodiment the closure member is shown as being attached to the backing plate. This may be done by cutting out an annular section of rubber or a straight section and thereafter bending it to conform to the curvature of the member to which it is to be attached and then cementing it directly to the metallic member. This may be done by one of several processes now known. For example, as an adhesive agent there may be employed an aqueous suspension or emulsion of rubber or latex. The material is then treated to eliminate the water as it affects the cementation of the rubber to the metal.

It will be observed that the dimensions of the closure may be so chosen that when the drum and backing plate are mounted in their associated position, the rubber may lightly abut the contiguous portion of the drum. After rotation of the adjacent drum, sufficient of the closure will be worn down to provide a very small closure, that is to say, the closure member may be "run in" in much the same manner as piston rings, bearings, etc.

It will be seen that this method presents many advantages. The closure member is one which is inexpensive, and at the same time applicable directly to metallic surfaces. Unlike the closures of the present day, the closure structure of the invention may at any time be replaced with a new member. The old rubber closure may readily be cut or burnt off, and after cleansing of the associated metallic sections, a new ring may be applied. The rubber, and particularly when mounted on the backing plate, is subjected to but slight heat changes, and hence will maintain a very small clearance between the stationary and rotating parts. Because of its imperviousness to water, rubber serves as an ideal member to close off an opening which is constantly subjected to wettings. As before indicated, the particular type of rubber used may be widely varied. It may comprise a soft resilient mass or a vulcanized hard material; it may likewise consist of a fiber structure with which is incorporated the desired amount of rubber.

To more completely describe the invention there is shown the preferred embodiment of it in the accompanying drawings. In these the same reference numerals refer to similar parts throughout the several views of which:

Figure 1 is a sectional elevation of a rear wheel brake, and

Fig. 2 is an enlarged detail of the backing plate.

The invention is illustrated as embodied in a rear wheel brake structure of a conventional design. This comprises an axle 1 enclosed by the usual housing 2, and fitted at its free end with the wheel 3. Mounted on the wheel by suitable securing means is a brake drum having the head 4 and circumferential braking flange 5.

Associated with the drum so as to close off its open face is a backing plate 6. This is fixedly secured by any suitable means, either directly or indirectly to the axle housing. As is known, this plate serves to mount the brake anchoring and applying means as well as to protect the interior brake mechanism from dust, water, etc. To more effectively subserve this protective function, the backing plate is provided with a marginal flange 7, with which is associated a directly attached flexible closure 8.

The described structure, as has been noted, is given only by way of illustration and typifies any desired arrangement. The brake structure may comprise a servo brake having a plurality of pivoted shoes, or it may comprise a full wrap internal band. Likewise, the drum may be of any suitable design and if desired may be formed with a radially extending rigidifying flange. When the invention is applied to a front wheel brake, the backing plate should be mounted on the wheel spindle and the applying means properly mounted with respect to the axis of oscillation of the spindle as is well known by those skilled in the art.

In accordance with the invention the closure member 8 is made of a material which is easily and cheaply made up and which is readily attachable to the metal of the backing plate (or drum) without necessitating the use of mechanical securing means. As an example, this member may comprise a fabric such as friction duck, which is treated with a curable rubber composition. This material may be made up in sheets of the desired thickness and then cut in strips of suitable width and of a length conforming to the circumferential dimensions of the member to which it is to be attached.

When the closure is to be attached to the plate or drum, the bonding surface of the metal is thoroughly cleansed as by sand blasting, acid wash, etc. The cleansed surface of the metal, or the surface of the closure or both, may then be coated with a suitable cementing substance which has the property of bonding or cementing the rubber directly to the metal. As an example the rubber or metal may be coated with liquid solution of sulphur chloride dissolved in a suitable solvent such as benzol. The closure member may then be applied to the metal and the two placed in a vulcanizing press and heated for a sufficient time and at requisite temperatures to cure the rubber; that is to say, at approximately 300° F. for about an hour. After such a treatment the flexible closure is firmly bonded to the metallic surface.

The dimensions of the closure may be so chosen when the closure is mounted in associated relationship to the drum it will lightly abut the contiguous portion. Upon a moderate intermittent rotation of the drum the surface of the closure is then worn down so as to provide a desirably small clearance. When the closure is associated with a drum having a marginal lip of substantially no appreciable expansion, as described in copending application Serial No. 321,452, filed November 23, 1928, the closure may initially be fitted with the desired clearance and this will be maintained throughout operation.

It will be appreciated that a number of specific methods of bonding the closure liner to the metal may be employed. Thus in place of using sulphur chloride one may employ a vulcanized, rubberized fabric to one surface of which has been adhered a backing of a heat plastic rubber isomer in the one vulcanizing process. The heat plastic isomer may be made up by reacting suitable proportions of rubber and sulphuric acid or phenol sulphuric acid in the well known manner. The resulting liner may be adhered to the metal surface by treating the isomer backing with gasoline and pressing it against the metal surface until bonded. Likewise, the liner may be adhered to by the metal by first coating the metal with a cement made from the isomer and after this has dried pressing on the liner and holding it under pressure until the cement has set.

There are a relatively large number of specific methods of cementing the liner to the metallic surface which are known to those skilled in the art and which may be employed. With these it is thus possible to provide a closure member comprising a replaceable nonmetallic water impervious liner which is cemented throughout its periphery to the metal and eliminates the use of spaced mechanical serving means, with the attendant danger of loosening and gaps between the two surfaces. The backing plate to which the liner has been adhered presents a continuous surface extending from a position closely adjacent the rotating drum.

As indicated hereinbefore, the liner is applicable to any type of associated drum and backing plate. The backing plate is shown on the drawing as including a peripheral groove into which the liner singly fits. However, the liner may be attached directly to the face of the plate so that it projects over the adjacent edges of the drum and thus eliminates the lateral flange on the plate. Similarly the liner may be made up channel shaped in cross-section and applied to an axially projecting flange on the plate so that the webs or furcations on the liner straddle a marginal radial lip on the drums. These are merely indicative of a large number of specific designs and adaptations of the respective members, all of which are comprehended within the scope of the present disclosure.

While I have shown and described a specific embodiment of the invention it is to be understood that this is merely illustrative of the method of effectuating the underlying principles which, as noted, has a wide range of permissive variations in material, designs and associations of cooperating parts.

What I claim is:—

1. A brake apparatus comprising a drum, a backing plate, a non-metallic non-absorbent closure member between the drum and plate adhered directly to the plate.

2. A brake apparatus comprising a rotatable drum member, a metallic plate member, and non-metallic non-absorbent closure adhered to one of the members.

3. A backing plate for brake drums comprising a face portion of curvilinear outline and a flexible projecting flange of non-absorbent material cemented to the plate.

4. A backing plate for brake drums comprising a metallic plate having a laterally extending flange and a water impervious non-metallic liner cemented to the flange.

5. A brake apparatus comprising a drum, friction means mounted internally thereof adapted to engage the drum, means to close off the drum comprising a metallic and non-absorbent plate having a flexible non-metallic portion cemented thereto and closely juxtaposed to the drum to form a closure.

6. A brake apparatus comprising a rotatable and non-rotatable part and a section of resilient material cemented to the non-rotatable part.

7. A brake apparatus comprising a rotatable drum, a backing plate juxtaposed to the drum, a liner of rubberized fabric adhered directly to the plate and forming with it a closure for the drum.

In testimony whereof I affix my signature.

RAYMOND J. NORTON.